United States Patent
Serena et al.

(10) Patent No.: US 11,168,811 B2
(45) Date of Patent: Nov. 9, 2021

(54) MACHINE AND METHOD FOR REPAIRING A PIPELINE IN A BODY OF WATER

(71) Applicant: SAIPEM S.p.A., San Donato Milanese (IT)

(72) Inventors: Alberto Serena, Ponzano Veneto (IT); Diego Magri, Spinea (IT); Paolo Vielmo, Domegge di Cadore (IT); Riccardo Mattarucco, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 79 days.

(21) Appl. No.: 16/461,629

(22) PCT Filed: Nov. 22, 2017

(86) PCT No.: PCT/IB2017/057342
§ 371 (c)(1),
(2) Date: May 16, 2019

(87) PCT Pub. No.: WO2018/096474
PCT Pub. Date: May 31, 2018

(65) Prior Publication Data
US 2020/0063895 A1 Feb. 27, 2020

(30) Foreign Application Priority Data

Nov. 22, 2016 (IT) .......................... 102016000118058

(51) Int. Cl.
*F16L 1/26* (2006.01)
*F16L 55/168* (2006.01)
(Continued)

(52) U.S. Cl.
CPC ............. *F16L 1/26* (2013.01); *F16L 55/1686* (2013.01); *F16L 55/175* (2013.01); *B29C 63/06* (2013.01);
(Continued)

(58) Field of Classification Search
CPC ....... F16L 1/26; F16L 55/1686; F16L 55/175; F16L 55/18; F16L 58/1063; B29C 53/58;
(Continued)

(56) References Cited

U.S. PATENT DOCUMENTS 4,058,427 A * 11/1977 Wilson ................... B29C 63/105
156/392
4,113,545 A * 9/1978 Stuart, Jr. ............... B29C 63/14
156/392
(Continued)

FOREIGN PATENT DOCUMENTS

DE 3012023 A1 * 10/1981 ............. H01B 13/08
EP 0548231 1/2002
WO WO 2011/162747 12/2011

OTHER PUBLICATIONS

Notification Concerning Submission, Obtention or Transmittal of Priority Document for International Application No. PCT/IB2017/057342 dated Feb. 23, 2018.
(Continued)

*Primary Examiner* — Philip C Tucker
*Assistant Examiner* — Brian R Slawski
(74) *Attorney, Agent, or Firm* — Neal, Gerber & Eisenberg LLP (57) ABSTRACT

A machine configured to repair a pipeline extending along a longitudinal axis determined in a body of water, the machine comprising: a frame configured to be clamped to the pipeline; an applicator configured to apply material along an outer surface of the pipeline and comprising a support body
(Continued)

shaped as an open ring and configured to be arranged about the pipeline; and an actuating assembly, which is supported by the frame, is arranged between the frame and the applicator, has a distal end configured to support the applicator in a cantilevered fashion and in a rotatable manner, and is configured to displace the applicator along the longitudinal axis and/or to rotate the applicator about the longitudinal axis.

10 Claims, 7 Drawing Sheets

(51) Int. Cl.
| | | |
|---|---|---|
| *F16L 55/175* | (2006.01) | |
| *B29C 63/10* | (2006.01) | |
| *B65H 81/08* | (2006.01) | |
| *F16L 58/10* | (2006.01) | |
| *F16L 55/18* | (2006.01) | |
| *B29C 65/00* | (2006.01) | |
| *B29C 63/06* | (2006.01) | |

(52) U.S. Cl.
CPC .............. *B29C 63/10* (2013.01); *B29C 66/84* (2013.01); *B65H 81/08* (2013.01); *F16L 55/18* (2013.01); *F16L 58/1063* (2013.01)

(58) Field of Classification Search
CPC ....... B29C 53/70; B29C 53/827; B29C 63/06; B29C 63/065; B29C 63/08; B29C 63/10; B29C 63/105; B29C 63/483; B29C 63/485; B29C 65/48; B29C 65/50; B29C 66/84; B65H 81/06; B65H 81/08
USPC ....... 156/53, 60, 71, 94, 143, 184, 185, 187, 156/195, 349, 391, 392, 425, 428, 443, 156/475, 486, 538, 574, 575, 577; 405/184.1; 118/305, 307; 138/97, 98, 99
See application file for complete search history.

(56) References Cited

U.S. PATENT DOCUMENTS

| | | | | |
|---|---|---|---|---|
| 4,125,422 A | * | 11/1978 | Stuart, Jr. | .............. B65H 81/08 |
| | | | | 156/392 |
| 4,261,785 A | * | 4/1981 | Hunter | ................... B65H 81/08 |
| | | | | 156/392 |
| 5,136,969 A | | 8/1992 | Chapman | |
| 5,417,786 A | * | 5/1995 | Denman | ............... B29C 63/105 |
| | | | | 156/187 |
| 5,491,880 A | * | 2/1996 | Labiche | .................. B29C 63/10 |
| | | | | 156/282 |
| 2011/0311716 A1 | * | 12/2011 | Taylor | ................... B05B 12/087 |
| | | | | 427/8 |
| 2015/0127194 A1 | | 5/2015 | Slimani et al. | |

OTHER PUBLICATIONS

International Search Report and Written Opinion for International Application No. PCT/IB2017/057342 dated Mar. 1, 2018.

* cited by examiner

MACHINE AND METHOD FOR REPAIRING A PIPELINE IN A BODY OF WATER

PRIORITY CLAIM

This application is a national stage application of PCT/IB2017/057342, filed on Nov. 22, 2017, which claims the benefit of and priority to Italian Patent Application No. 102016000118058, filed on Nov. 22, 2016, the entire contents of which are each incorporated by reference herein.

TECHNICAL FIELD

The present disclosure relates to a machine for repairing a pipeline in a body of water.

In particular, the present disclosure relates to a machine for repairing a pipeline installed on the bed of a body of water in particular for transporting hydrocarbon products.

BACKGROUND

European Patent EP 548,231 B2 and U.S. Published Patent Application No. 2015/127,194 A describe respective machines for repairing a pipeline in a body of water. Each of the machines disclosed in the aforesaid documents comprises a frame configured to be clamped to the pipeline an actuating assembly configured to rotate with respect to the frame about the pipeline; and an applicator, which is configured to apply a tape and is supported so as to slide along a guide of the actuating assembly.

Repairing a pipeline by taping involves winding the tape in a spiral and forming one or more layers of tape along a section of the outer surface of the pipe. Therefore, to repair a pipeline by taping, the applicator must be made to rotate about the pipeline several times and, at the same time, the applicator must be moved along the pipeline.

The structure of the machines described in the aforesaid patent literature has the disadvantage of being relatively difficult to power electrically. The motor designed to translate the applicator is mounted on a support element configured to rotate about the pipeline and, as a consequence, the power supply cable of said motor, in use, is wound around the pipeline and about parts of the machine.

SUMMARY

The purpose of the present disclosure is to provide a machine configured to repair a pipeline on the bed of a body of water that overcomes certain of the drawbacks of certain of the prior art and is particularly versatile.

According to the present disclosure there is provided a machine configured to repair a pipeline in a body of water, wherein the pipeline extends along a designated longitudinal axis, the machine comprising:
  a frame configured to be clamped to the pipeline;
  an applicator configured to apply material along an outer surface of the pipeline and comprising a support body shaped as an open ring and configured to be arranged about the pipeline; and
  an actuating assembly, which is supported by the frame, is arranged between the frame and the applicator, has a distal end configured to support the applicator in a cantilevered fashion and in a rotatable manner, and is configured to displace the applicator along the longitudinal axis and/or to rotate the applicator about the longitudinal axis.

It should be appreciated that based on the configuration of the machine the movable elements do not cause any winding of the electric cables or hydraulic conduits.

In particular, the support body has a friction surface which enables the transmission of the rotation by at least an actuator mounted on the actuating assembly. In certain embodiments, two actuators are used in order to guarantee the contact with the support body, which is provided with a groove so that it can be placed around the pipeline. In particular, the actuator comprises at least one friction wheel arranged in contact with the support body. This type of transmission is relatively very easy to implement and does not cause inconveniences.

In particular, the applicator comprises at least one pin mounted on the support body and configured to support a reel on which a tape is wound; or at least one injector.

The applicator is particularly versatile and is configured both to wind a tape around the pipeline and to inject material onto the outer face of the pipeline.

In particular, the actuating assembly comprises an annular guide configured to support in a rotatable manner the applicator and at least one actuator configured to mechanically transmit the rotational motion from the actuating assembly to the applicator. This configuration makes the machine relatively stable and relatively easy to use in difficult environments and when controlled remotely.

In particular, the actuating assembly comprises a carriage slidingly coupled to the frame and configured to support the annular guide and a linear actuator to move the carriage with respect to the frame. In this way, the carriage determines the rectilinear displacement of the applicator.

According to one embodiment, the annular guide is fixed to the carriage, which makes the machine particularly relatively simple and capable of applying material to a rectilinear pipeline.

According to alternative embodiments, the actuating assembly comprises a mechanism arranged between the carriage and the annular guide to incline the annular guide with respect to the carriage in order to move the applicator along curved paths.

In particular, the mechanism comprises a sliding arm mounted on the carriage and moveable transversely to the direction of displacement of the carriage; and a swivel arm, which is hinged to the annular guide, and is hinged to the sliding arm about a given or designated axis. This embodiment is particularly relatively convenient for pipelines with curved sections having a constant curvature radius.

Alternatively, the actuating assembly comprises at least one linear guide mounted on the carriage in a selectively swinging manner; and at least one bar, which is slidingly coupled to the linear guide, and is hinged to the annular guide. This embodiment is relatively very versatile.

In particular, the machine comprises a docking station configured for mechanically and functionally coupling to a ROV configured to supply power and control to the machine. In this way, the machine can easily be transferred and controlled in the body of water and controlled remotely.

In particular, the machine comprises a rod, which is mounted on the frame and extends in the area of the applicator and is configured to support the free end of a tape. In this way, when the machine is clamped to the pipeline, the tape winding step can be started immediately.

A further purpose of the present disclosure is to provide a method for repairing a pipeline that overcomes certain of the drawbacks of certain of the prior art solutions.

According to the present disclosure there is provided a method for repairing a pipeline in a body of water, wherein the pipeline extends along a given or designated longitudinal axis, the method comprising the steps of clamping a frame of the machine to the pipeline;

applying material to an outer surface of the pipeline by an applicator comprising a support body shaped as an open ring; and advancing in a given or designated direction and/or rotating the applicator along the longitudinal axis and/or about the longitudinal axis by an actuating assembly arranged between the frame and the applicator and configured to support the applicator at the distal end thereof.

Such a configuration provides that the applicator is not hindered, in use, by electric cables and/or hydraulic hoses.

In particular, the method consists in winding a tape in a spiral around the pipeline using at least one reel, which contains the tape and is mounted in a rotatable manner on the support body. In this way, taping can be performed along relatively long sections of pipe and with successive changes of direction in order to apply superimposed layers without any breaks in the tape.

Alternatively, the method consists in applying material along the outer face of the pipeline by arranging the material on the inner face of a tape and winding the tape by rotating the support body. In this way, it is possible to fill in an opening and at the same time press and protect the filled part using the tape.

Alternatively, the method consists in injecting material along the outer face of the pipeline using at least one injector and a die mounted on the support body. In this way large amounts of material can be applied.

According to a further alternative embodiment, the method consists in injecting material along the outer face of the pipeline using at least one injector; and spreading the material along the outer face of the pipeline. In this way it is possible to apply relatively soft material evenly along a relatively very large surface.

Additional features and advantages are described in, and will be apparent from the following Detailed Description and the figures.

BRIEF DESCRIPTION OF THE DRAWINGS

Further characteristics and advantages of the present disclosure will become clear from the following description of non-limiting embodiments thereof, with reference to the figures in the accompanying drawings, in which.

DETAILED DESCRIPTION

Figure 1:
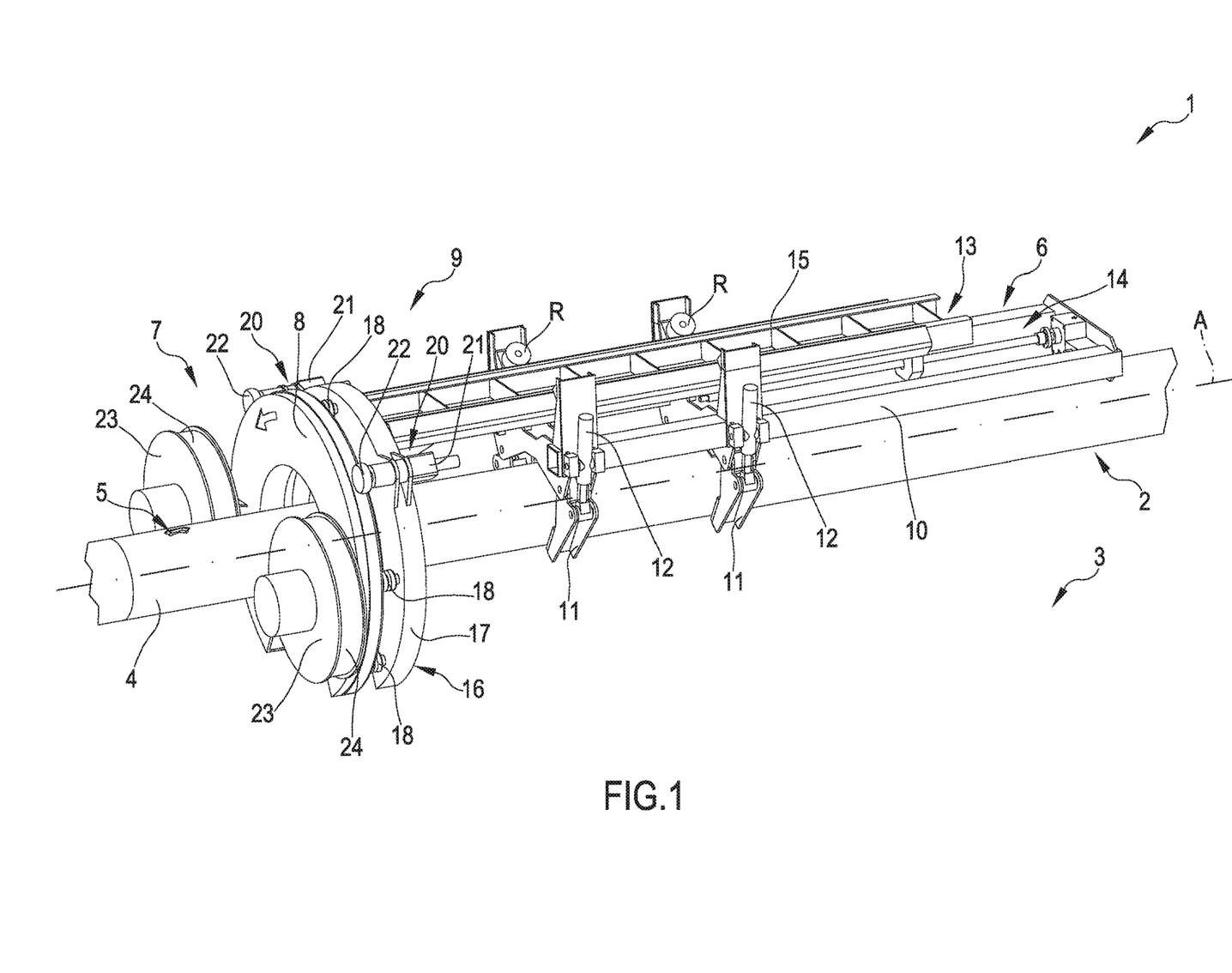
FIG. 1 is a perspective view, with parts removed for the sake of clarity, of a machine for repairing a pipeline according to a first embodiment of the present disclosure and during a step of taping a damaged pipeline.

With reference to FIG. 1, illustrated as a whole is a machine 1 configured to repair a pipeline 2 installed on a bed 3 of a body of water. The pipeline 2 extends along a longitudinal axis A and has a section 4 along which there is a damaged area 5, for example a cavity or a cut or an area of swelling in the protective coating of the pipeline 2.

In the example that is illustrated the machine 1 is clamped to the pipeline 2 and is configured to cover the section 4 and, hence, to repair the pipeline 2. The machine 1 is configured to be coupled to a remotely operated vehicle ("ROV"), which is not illustrated in FIG. 1 and is configured to activate the machine 1 and to transport the machine 1 in the body of water. The pipeline 2 is first raised from the bed 3 or the bed 3 is dug out in the area of the section 4 to enable the machine 1 to be clamped to the pipeline 2 so that the pipeline 2 can be repaired.

The machine 1 comprises a frame 6 configured to be clamped to the pipeline 2; an applicator 7 configured to apply material along an outer surface of the pipeline 2 and comprising a support body 8 shaped as an open ring and configured to be arranged about the pipeline 2; and an actuating assembly 9, which is supported by the frame 6, is arranged between the frame 6 and the applicator 7, has a distal end configured to support the applicator 7 in a cantilevered fashion and in a rotatable manner, and is configured to displace the applicator 7 along the longitudinal axis A and/or to rotate the applicator 7 about the longitudinal axis A.

The frame 6 comprises a main body 10; jaws 11 hinged to the main body 10; and actuators 12 to move the jaws 11 between an open position and a closed position to selectively release and clamp the pipeline 2. The frame 6 defines a guide 13 on which the actuating assembly 9 is slidingly mounted so as to be able to move along the longitudinal axis A of the pipeline 2. To that end, the actuating assembly comprises an actuator 14 mounted on the main body 10 of the frame 6.

The actuating assembly 9 comprises a carriage 15 that is slidingly coupled to the frame 6 and configured to support the support 8 and the actuator 14 to move the carriage 15 with respect to the frame 6. In the example that is illustrated the carriage 15 is able to slide along the guide 13, which is provided with rollers R to facilitate the sliding of said carriage 15. The actuating assembly 9 comprises an annular guide 16 configured to support the applicator 7 in a rotatable manner. In the example illustrated in FIG. 1 the annular guide 16 is hinged to the carriage 15.

Figure 2:
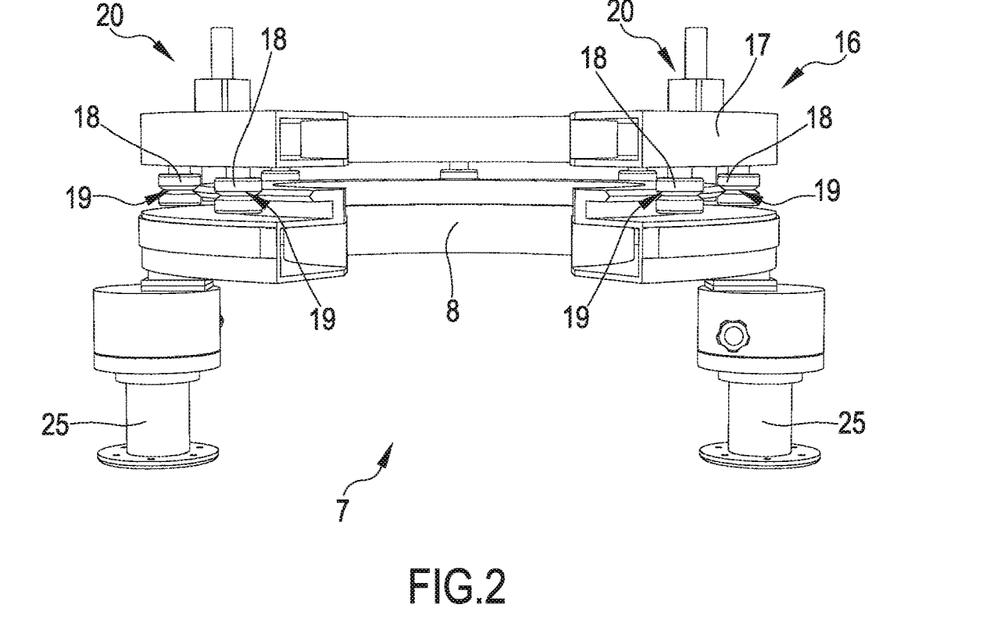
FIGS. 2 and 3 are perspective views, with parts removed for the sake of clarity, of a detail of the machine in FIG. 1.

With reference to FIG. 2, the annular guide 16 is shaped as a circular sector and comprises an open ring 17 and a plurality of rollers 18, each of which is mounted in a rotatable manner on the open ring 17 and has a groove 19 to house part of the support body 8 of the applicator 7.

Figure 3:
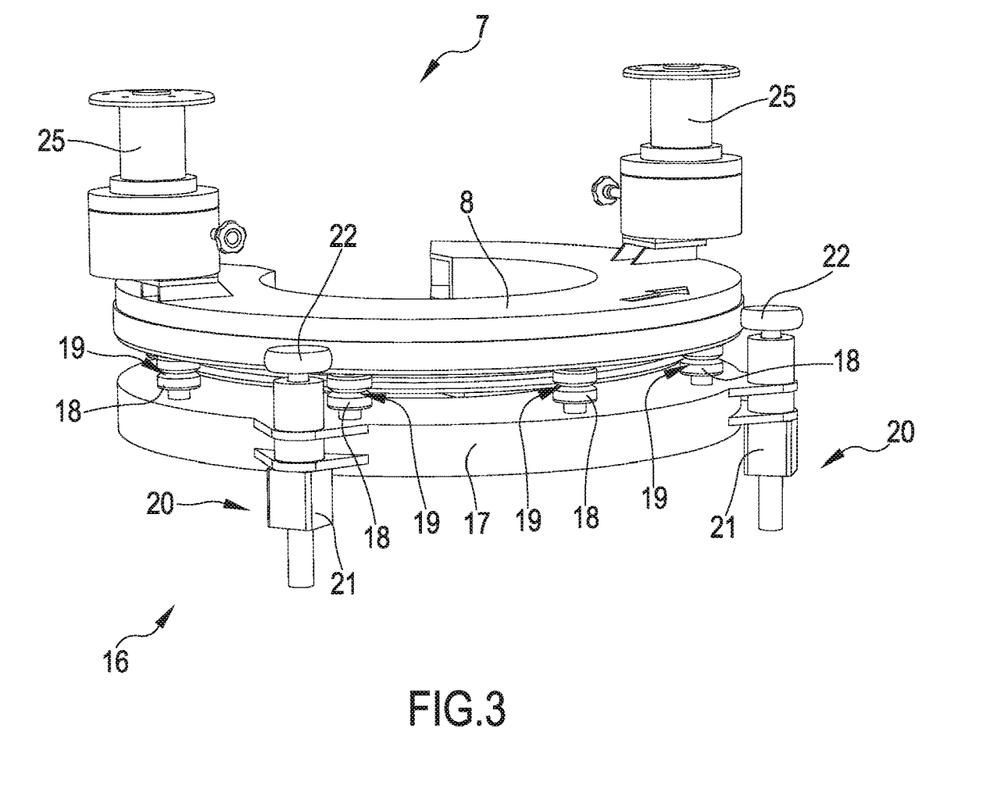

With reference to FIG. 3, the annular guide 16 has actuators 20 to make the applicator 7 rotate, Each actuator 20 comprises a motor 21 and a friction wheel 22 arranged in contact with a cylindrical face of the support body 8 of the applicator 7. In certain embodiments, the cylindrical face of the support body 8 has a rolling track configured to ensure the friction between the friction wheel 22 and the support body 8.

With reference to the machine illustrated in FIG. 1, the machine 1 is configured to tape the rectilinear section 4 of rectilinear pipeline 2. In the example illustrated in FIG. 1, two reels 23 are shown which contain respective rolls of a tape 24, are supported in a rotatable manner by the support body 8 and, in use, are arranged on diametrically opposite sides of the pipeline 2. The use of two reels 23 makes it possible to reduce the time required to repair the pipeline 2, although the use of a single reel 23 and the use of more than two reels 23 are alternatives that fall within the scope of protection of the present disclosure.

With reference to FIGS. 2 and 3, the applicator comprises pins 25 configured to support the respective reels 23 (FIG. 1) in a rotatable manner.

Figure 4:
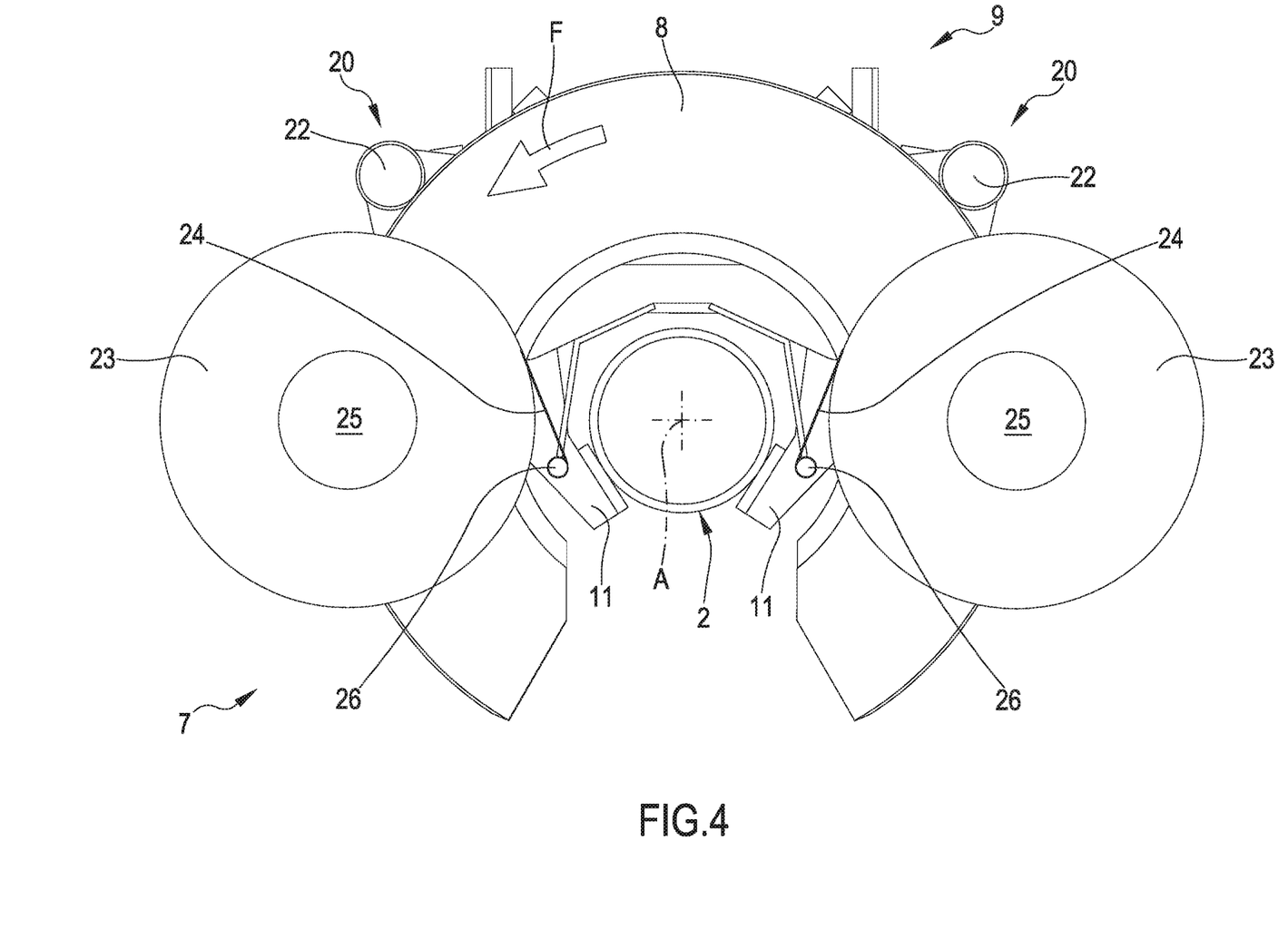
FIG. 4 is a schematic view, with parts removed for the sake of clarity, of the machine in FIG. 1.

With reference to FIG. 4, before the taping operation starts, the free end of each tape 24 is fixed to the free end of a rod 26, which is integral with the frame 6, in particular with the main body 10 of the frame 6. In practice, the frame 6 comprises two rods 26, each of which, in use, is arranged between the pipeline 2 and a respective reel 23 to support the free end of the respective tape 24.

The configuration shown in FIG. 4 schematically represents the step that precedes the taping of the pipeline 2.

In use and with reference to FIG. 4, the applicator 7 is rotated in the direction indicated by the arrow F, while the actuating assembly 9 is made to advance parallel to the longitudinal axis A of the pipeline 2. Thanks to the combined rotation and translation of the applicator 7 the tapes 24 are wound in a spiral around the pipeline 2 until completely covering the rectilinear section of pipeline 4 with the damaged area 5 (FIG. 1) and, by reversing the direction of translation of the applicator 7, successive layers can be applied without any break in the tape 24.

Figure 5:
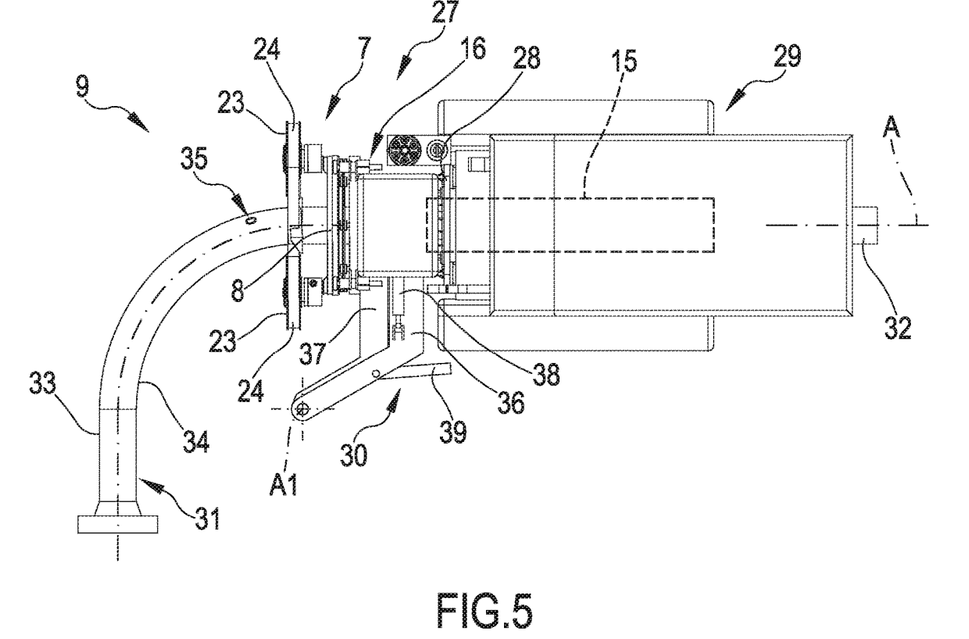
FIGS. 5 and 6 are plan views, with parts removed for the sake of clarity, of a machine for repairing a pipeline according to a second embodiment of the present disclosure and during two respective operating steps.
Figure 6:
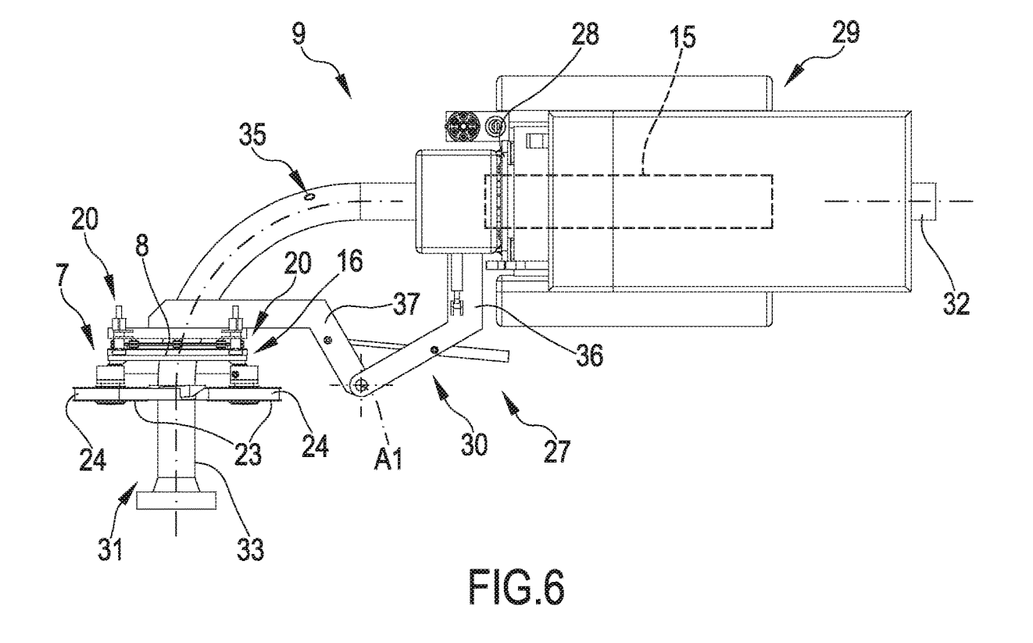

With reference to FIGS. 5 and 6, the machine 27 comprises the same structural elements as those described with reference to the machine 1 (FIGS. 1 to 4) and differs from the machine 1 in that the frame 6 comprises a docking station 28 for a ROY 29 and the actuating assembly 9 comprises a mechanism 30 arranged between the carriage 15 and the annular guide 16 to enable the applicator 7 to advance along curved paths. In other words, the machine 27 can be used to tape pipelines with curved sections, whereas the machine 1 (FIGS. 1 to 4) can only be used to tape rectilinear pipelines. FIGS. 5 and 6 show a pipeline 31 which extends along an axis A and has two rectilinear sections 32 and 33 joined by a curved section 34, along which there is a damaged area 35. The mechanism 30 enables the annular guide 16 to be inclined with respect to the carriage 15 about an axis of rotation A1. In this way, the positioning plane of the annular guide 16 remains perpendicular to the axis A along the curved section 34.

In the example, the mechanism 30 comprises a sliding arm 36 mounted on the carriage 15 and moveable transversely to the direction of displacement of the carriage 15; and a swivel arm 37, which is hinged to the annular guide 16 and is hinged to the sliding arm 36 about said designated axis A1. The mechanism 30 further comprises an actuator 38 configured to control the position of the sliding arm 36 and an actuator 39 configured to control the position of the swivel arm 37. In general, the sliding of the carriage 15 permits the displacement of the applicator 7 parallel to the rectilinear section 32, the sliding arm 36 permits the displacement of the applicator 7 parallel to the rectilinear section 33, and the swivel arm 37 permits the displacement of the applicator 7 parallel to the curved section 34 when the curvature radius is constant.

When the curvature radius of the curved section is not constant, the sliding arm 36 and/or the carriage 15 and the swivel arm 37 must be operated simultaneously.

Figure 7:
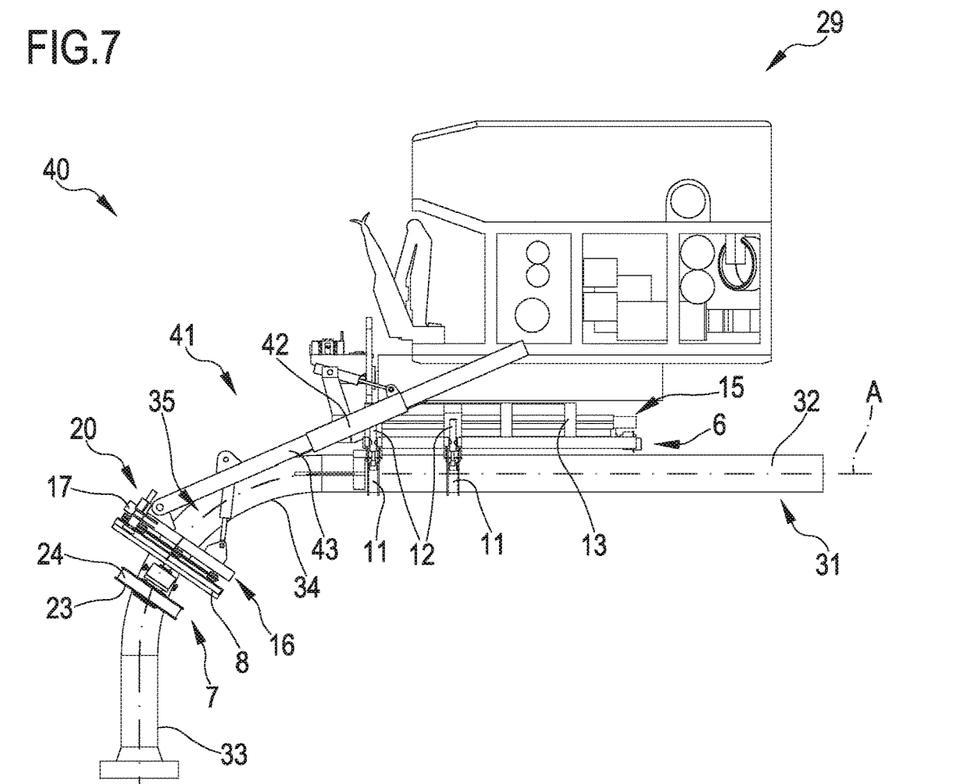
FIGS. 7 and 8 are a side elevation view and a plan view, respectively, with parts removed for the sake of clarity, of a machine for repairing a pipeline according to a third embodiment of the present disclosure.
Figure 8:
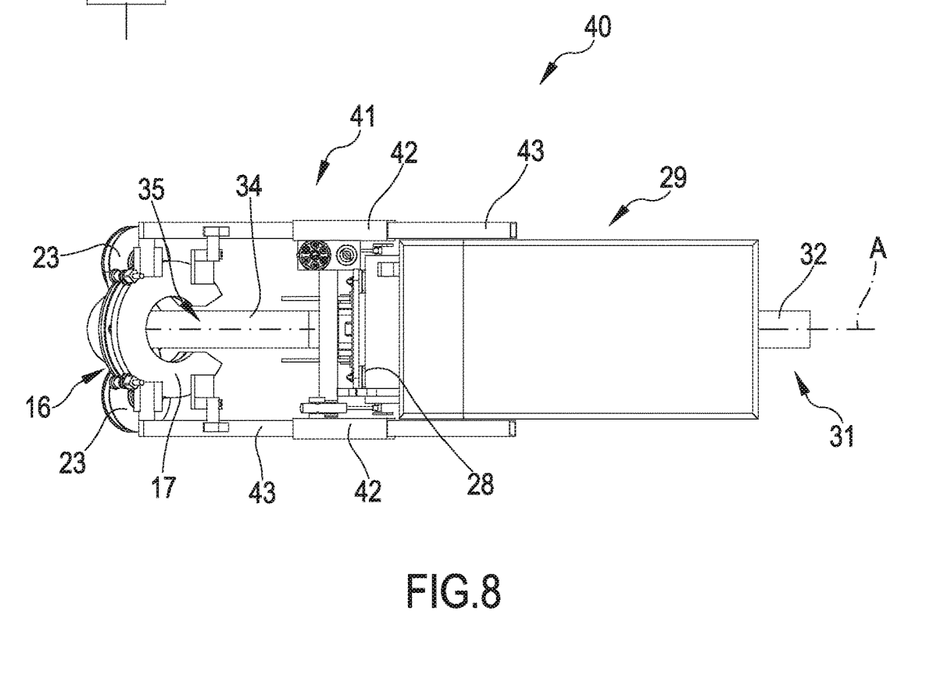

With reference to FIGS. 7 and 8, the machine 40 comprises the same structural elements as those described with reference to the machine 27 (FIGS. 5 and 6) and differs from the machine 27 in that the actuating assembly 9 comprises a mechanism 41 arranged between the carriage 15 and the annular guide 16 to enable the applicator 7 to advance along curved paths. In the example the pipeline 31 has a rectilinear section 32 to which the machine 40 is clamped; a rectilinear section 33; and a curved section 34 which joins the rectilinear sections 32 and 33 and in which there is a damaged area. The mechanism 41 comprises a linear guide 42 that can selectively swing about an axis transversal to the axis of translation of the carriage 15; and a bar 43, which is engaged in the guide 42, can selectively slide with respect to the guide 42, and is hinged to the annular guide 16. In particular, the mechanism 41 comprises two linear guides 42 and two bars 43 which are hinged to the annular guide 16 and are arranged on opposite sides of the pipeline 31. The curved section 34 is thus taped by simultaneously adjusting the direction of the linear guide 42, the direction of the annular guide 16 with respect to the bar 43, and the position of the bar 43 with respect to the linear guide 42.

The embodiments of the present disclosure described with reference to the foregoing Figures are configured to tape a rectilinear section 4 of pipeline 2 or a curved section 34 of pipeline 31. In the examples that have been described the applicator 7 is thus equipped to wind at least one tape in a spiral around the pipeline by combining a rotation about the pipeline and a movement parallel to the longitudinal axis A of the pipeline 2 or 31.

Figure 9:
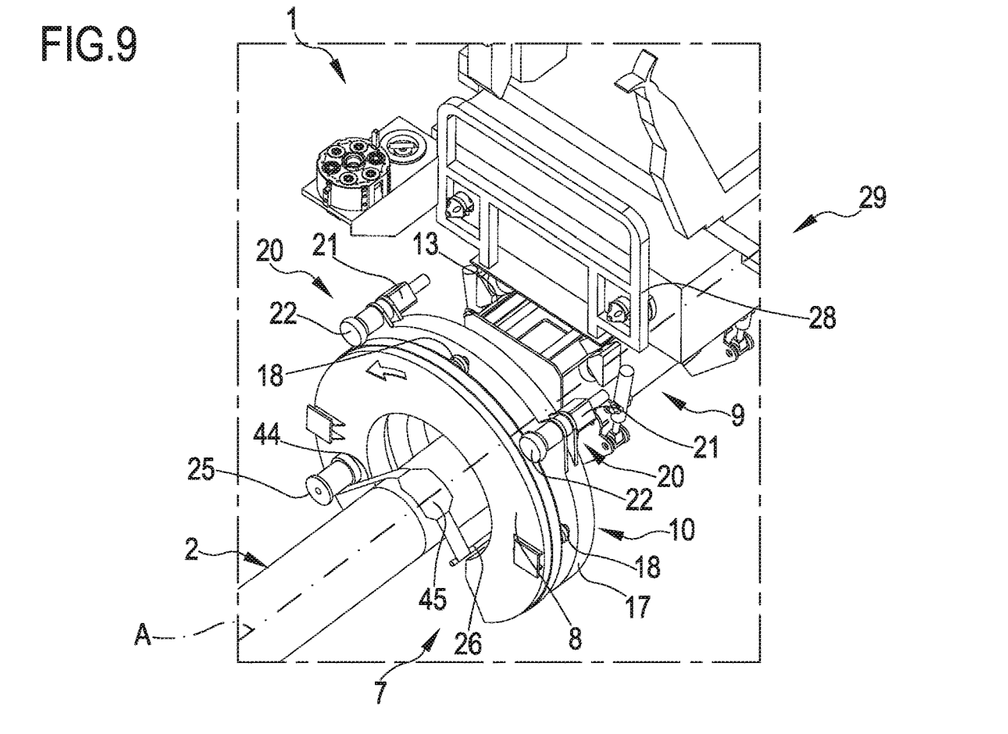
FIGS. 9 to 11 are perspective views, with parts removed for the sake of clarity, of respective alternative embodiments of FIG. 1.
Figure 10:
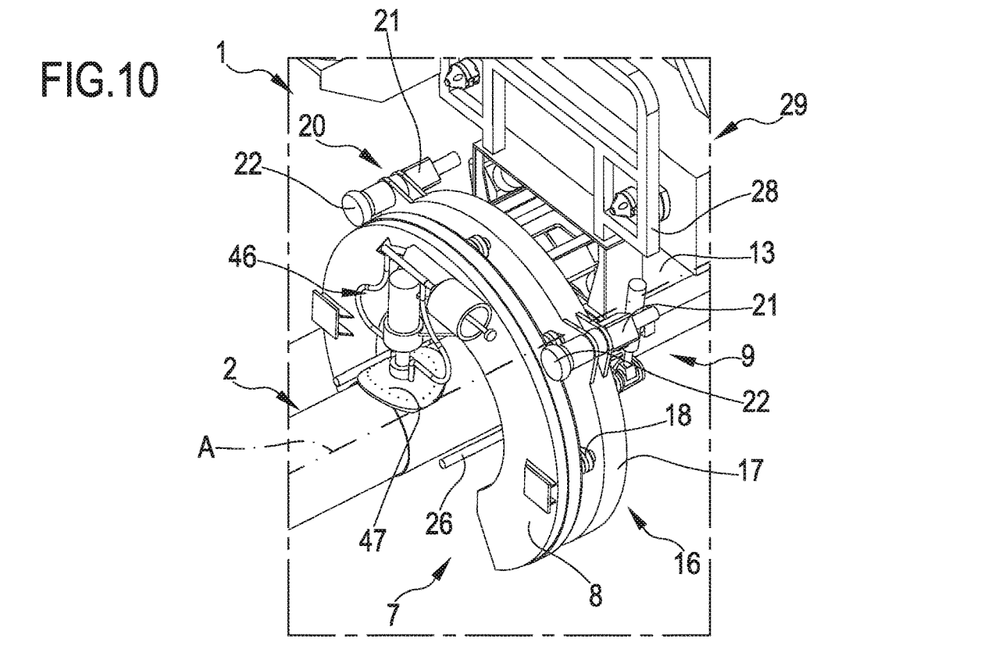
Figure 11:
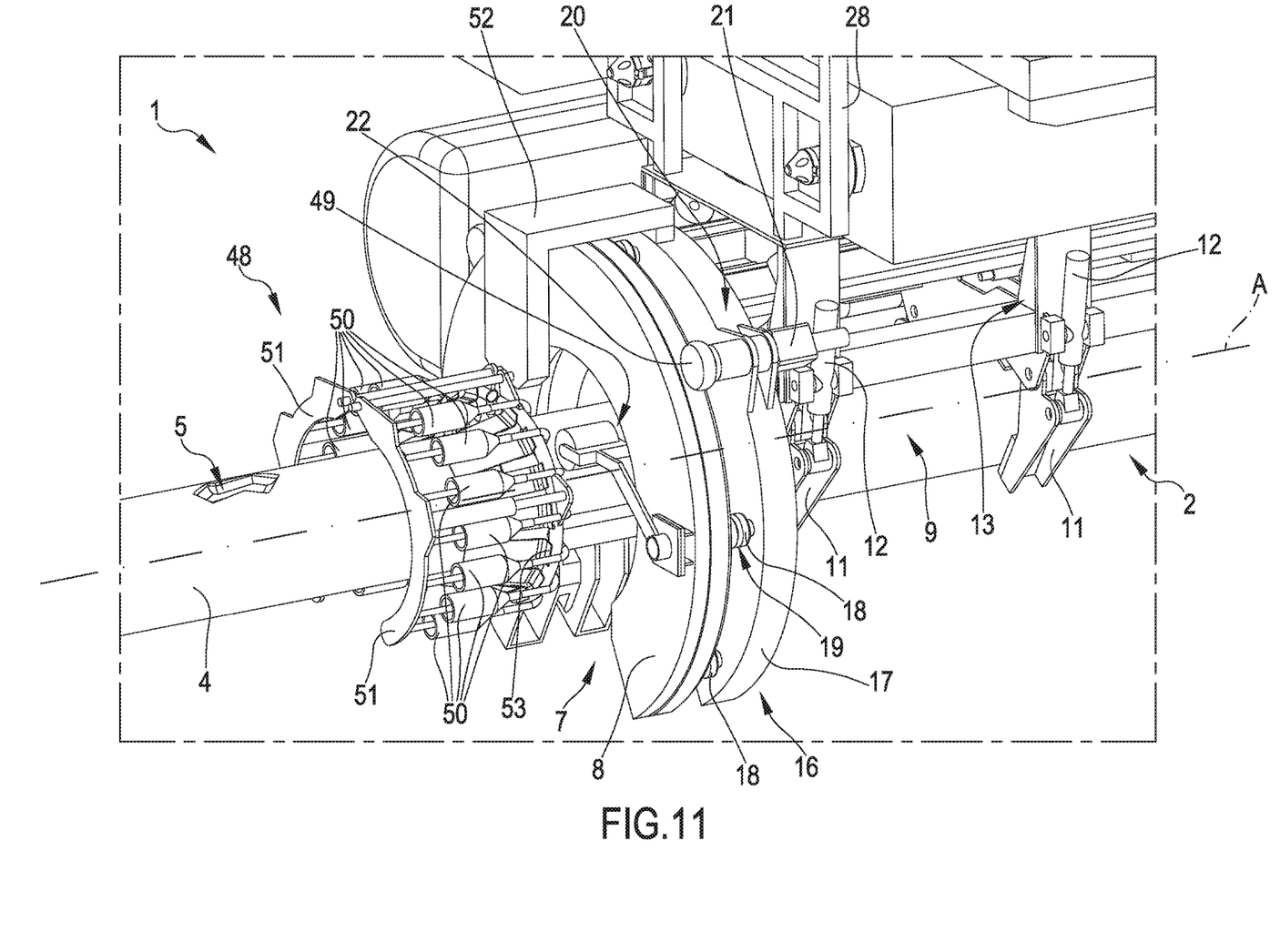

However, the applicator 7 can also be equipped to apply material other than the tape 24 (FIGS. 1, 4-8) to the outer surface of the pipeline 2 or 31 as illustrated in the alternative embodiments in FIGS. 9 to 11.

With reference to FIG. 9, the machine 1 is equipped with a single pin 25 and a semi-rigid metal tape 44 with a widened portion 45. The free end of the tape 44 is fixed to the rod 26. The filler, not illustrated, is arranged on the inner face of the widened portion 45 and applied to the outer face of the pipeline 2 at the point where the damaged area is located. As the applicator 7 rotates about the pipeline 2 the tape 44 is wound around the pipeline 2 and the widened portion 45 is pressed against the pipeline 2. When the tape 44 has been wound, the end of the tape 44 is fixed using fasteners that are not illustrated.

Alternatively, once the tiller as hardened, the tape 45 is removed and then the winding step is performed.

With reference to FIG. 10, the machine 1 is equipped with an injector 46 to inject the filler and with a die 47 with a shape that is complementary to the pipeline 2. The die 47 is configured to form a cavity with the recess (damaged part) along the outer surface of the pipeline 2. In use, the filler is injected into the cavity, and the water in the cavity is discharged through holes provided along the die 47. When the excess filler comes out of the holes in the die 47, this indicates with certainty that the cavity has been properly filled, the injection process stops and the filler is left to harden.

With reference to FIG. 11, the machine 1 is equipped with an injection unit 48 and a spreader 49, which in the example is a roller.

The injection unit 48 comprises a plurality of injectors 50; two supports 51, which are selectively movable with respect to one another and can be closed in a ring around the pipeline 2 and each of which supports a part of the plurality of injectors 50; and a frame 52 that can be fixed to the annular guide 16. Each support 51 is equipped with a respective scraper 53 arranged transversely to the axis of the pipeline 2.

The spreader 49 is mounted on the support body 8 and can be pressed against the outer face of the pipeline 2 and rotated about the pipeline 2.

In use, the injectors 50 are distributed around the pipeline 2 and are made to advance parallel to the longitudinal axis A of the pipeline 2 by the displacement of the carriage 15. The injectors 50 are activated simultaneously during the aforesaid advancement step to apply material to the outer face of the pipeline 2 while the scrapers 53 distribute the material parallel to the axis A. When the material has been applied and spread in the axial direction, the material is also spread in the circumferential direction with the spreader 49 by the rotation of the support body 8.

It is clear that the present disclosure includes further embodiments that are not specifically described herein without departing from the scope of protection of the claims set forth below. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A pipeline repair machine comprising:
    a frame configured to be clamped to a pipeline in a body of water, the pipeline extending along a longitudinal axis;
    an applicator configured to apply material along an outer surface of the pipeline and comprising a support body shaped as an open ring and configured to be arranged about the pipeline; and
    an actuating assembly comprising an annular guide configured to rotatably support the applicator, a carriage slidingly coupled to the frame and configured to support the annular guide, a first actuator configured to move the carriage with respect to the frame, and at least one second actuator configured to transmit a rotational motion from the actuating assembly to the applicator, wherein the actuating assembly:
        is supported by the frame,
        is coupled to the frame and the applicator,
        has a distal end configured to rotatably and cantileverly support the applicator, and
        is configured to at least one of: displace the applicator along the longitudinal axis, and rotate the applicator about the longitudinal axis.

2. The pipeline repair machine of claim 1, wherein the support body has a friction surface to enable a transmission of a rotation by at least the at least one second actuator of the actuating assembly.

3. The pipeline repair machine of claim 2, wherein the at least one second actuator comprises at least one friction wheel arranged in contact with the support body.

4. The pipeline repair machine of claim 1, wherein the applicator comprises at least one pin mounted on the support body and configured to support at least one of: a reel on which a tape is wound and at least one injector.

5. The pipeline repair machine of claim 1, wherein the annular guide is fixed to the carriage.

6. The pipeline repair machine of claim 1, wherein the actuating assembly comprises a mechanism arranged between the carriage and the annular guide and configured to incline the annular guide with respect to the carriage.

7. The pipeline repair machine of claim 6, wherein the mechanism comprises:
    a sliding arm mounted on the carriage and moveable transversely to a direction of displacement of the carriage; and
    a swivel arm which is hinged to the annular guide and is hinged to the sliding arm about a designated axis.

8. The pipeline repair machine of claim 1, wherein the actuating assembly comprises:
    a linear guide selectively swingably mounted on the carriage; and
    at least one bar which is slideably coupled to the linear guide and is hinged to the annular guide.

9. The pipeline repair machine of claim 1, further comprising a rod which is mounted on the frame, extends in an area of the applicator and is configured to support a free end of a tape.

10. The pipeline repair machine of claim 1, wherein the actuating assembly is arranged between the frame and the applicator.

* * * * *